(12) United States Patent
Siekman et al.

(10) Patent No.: US 10,392,526 B2
(45) Date of Patent: Aug. 27, 2019

(54) MATTING AGENT AND METHOD FOR OBTAINING THE SAME

(71) Applicant: Kronos International, Inc., Leverkusen (DE)

(72) Inventors: Janine Siekman, Bergisch Gladbach (DE); Martin Sandrock, Essen (DE); Nicole Kolmer-Anderl, Langenfeld (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 15/337,044

(22) Filed: Oct. 28, 2016

(65) Prior Publication Data

US 2017/0121551 A1    May 4, 2017

(30) Foreign Application Priority Data

Oct. 30, 2015 (EP) .................................. 15003103

(51) Int. Cl.

| | |
|---|---|
| *C09D 17/00* | (2006.01) |
| *C09C 1/36* | (2006.01) |
| *C09D 7/40* | (2018.01) |
| *C09D 7/61* | (2018.01) |
| *C09D 7/42* | (2018.01) |
| *C09D 133/08* | (2006.01) |
| *C09D 7/62* | (2018.01) |
| *C09D 1/00* | (2006.01) |
| *C08K 3/22* | (2006.01) |

(52) U.S. Cl.
CPC .......... *C09D 17/008* (2013.01); *C09C 1/3638* (2013.01); *C09C 1/3653* (2013.01); *C09D 1/00* (2013.01); *C09D 7/42* (2018.01); *C09D 7/61* (2018.01); *C09D 7/62* (2018.01); *C09D 7/69* (2018.01); *C09D 133/08* (2013.01); *C01P 2004/50* (2013.01); *C01P 2004/51* (2013.01); *C01P 2006/12* (2013.01); *C01P 2006/19* (2013.01); *C08K 2003/2241* (2013.01); *C08K 2201/005* (2013.01); *C08K 2201/006* (2013.01)

(58) Field of Classification Search
None
See application file for complete search history.

(56) References Cited

U.S. PATENT DOCUMENTS 3,953,421 A * 4/1976 Berstein ..................... C08J 3/12
                                                                                                                  106/214.2
5,061,473 A * 10/1991 De Cleyn ............ C01G 23/047
                                                                                                                     423/610

(Continued)

FOREIGN PATENT DOCUMENTS

| DE | 1519232 | 10/1970 |
|---|---|---|
| DE | 19516253 | 10/1996 |

(Continued)

*Primary Examiner* — Melvin C. Mayes
*Assistant Examiner* — Colette B Nguyen
(74) *Attorney, Agent, or Firm* — Locke Lord, LLP (57) ABSTRACT

The invention relates to a matting agent comprising agglomerates of pigment particles, to a method for the preparation of such matting agents, and to coating formulations containing the matting agents disclosed herein. The present invention further relates to pigmented mat surfaces, and to the use of agglomerates of pigment particles for matting pigmented coatings.

36 Claims, 3 Drawing Sheets

(56) References Cited

U.S. PATENT DOCUMENTS

| | | | |
|---|---|---|---|
| 2004/0063844 A1* | 4/2004 | Urs | C08G 18/10 |
| | | | 524/492 |
| 2005/0202243 A1* | 9/2005 | Bohach | B82Y 30/00 |
| | | | 428/402 |
| 2006/0047047 A1* | 3/2006 | Patel | B82Y 30/00 |
| | | | 524/447 |
| 2010/0279083 A1* | 11/2010 | Trummer | C09C 1/642 |
| | | | 428/195.1 |
| 2011/0104220 A1* | 5/2011 | Schmidt | A61K 8/0275 |
| | | | 424/401 |
| 2014/0037890 A1* | 2/2014 | McJunkins | C09D 5/028 |
| | | | 428/90 |
| 2014/0242387 A1* | 8/2014 | Jakob | C01F 11/183 |
| | | | 428/402 |
| 2015/0023899 A1* | 1/2015 | Klein | A61K 8/025 |
| | | | 424/63 |
| 2017/0121551 A1* | 5/2017 | Siekman | C09D 1/00 |

FOREIGN PATENT DOCUMENTS

| | | | |
|---|---|---|---|
| EP | 1398301 | | 12/2003 |
| JP | 57123253 | * | 7/1982 |

\* cited by examiner

MATTING AGENT AND METHOD FOR OBTAINING THE SAME

RELATED APPLICATIONS

This application claims the benefit of EP Patent App. No. 15003103.7 filed Oct. 30, 2016.

BACKGROUND

Field of the Invention

The invention relates to a matting agent comprising agglomerates of pigment particles, to a method for the preparation of such matting agents, and to coating formulations containing the matting agents disclosed herein. The present invention further relates to a plastic containing such matting agents, to pigmented mat surfaces, and to the use of agglomerates of pigment particles for matting pigmented coatings.

Technological Background of the Invention

Surfaces of plastics, laminates and coatings, such as paints and printing inks, are conventionally matted by selective roughening in the micro range. The light impinging on the roughened surface is consequently scattered diffusely rather than directionally reflected. The height, shape and number of the surface structures determine the degree of gloss of the coating, of the paint film, or of the printing ink.

Specific matting agents are usually added to achieve a mat surface. Such matting agents include, for example, spherical particles with a particle size within a range of from 1 to about 20 µm, as a function of the film layer thickness. Other usual matting agents are based on precipitated or pyrogenic silicas or silica gels, but also matting agents based on duromers, waxes or thermoplasts. Further known is the suitability of silicates, such as diatomaceous earth and calcined china clay, as well as calcium carbonate and different kinds of hollow spheres.

EP 1 398 301 B1 discloses matting agents for paints and lacquers based on precipitated silicas having particle sizes (d50) within a range of from 5 to 15 µm and a specific surface (BET) of from 350 to 550 $m^2/g$. The silicas are optionally coated with wax.

Further, DE 195 16 253 A1 describes matting agents based on spray-dried silica gel. In order to ensure sufficient stability of the aggregates, a binder, such as a layer silicate, pyrogenic silica or organic polymer, is used. The agent has a particle size of from 1 to 20 µm and a specific pore volume of from 0.4 to 2.5 mL/g.

Finally, DE 1 519 232 A1 discloses a mat coating containing pigment agglomerates prepared by the spray-drying and subsequent annealing of commercially available pigments together with sodium silicate as a binder. The agglomerates have diameters of from 2 to 70 µm.

Conventional matting agents are incorporated in coating formulations. The latter are applied to substrate surfaces in order to mat the surface. Due to known matting agents contained, the formulations have significant disadvantages in the preparation and handling thereof. Inter alia, established agents tend to dust. Further, the agents are mechanically comminuted when incorporated in coating formulations. This leads to a significant increase in viscosity of the formulation, which makes the production, handling and processing more difficult. Coatings containing conventional matting agents are chemically unstable, susceptible to soil, and exhibit low abrasion resistance. This results in a quick wear and unaesthetic appearance of the mat surface.

Therefore, there is a need in the art for a matting agent that overcomes the drawbacks of the prior art at least in part.

BRIEF DESCRIPTION OF THE INVENTION

It is the object of the invention to provide a matting agent for producing pigmented mat surfaces, which can overcome at least part of the drawbacks of the prior art agents.

The object is achieved by a matting agent for preparing pigmented mat surfaces comprising agglomerates of pigment particles, characterized in that said agglomerates have an average agglomerate size d50 of from 2 to 200 µm, preferably from 2 to 100 µm, more preferably from 2 to 50 µm, and most preferably from 2 to 20 µm, and a specific surface (BET) of from 5 to 50 $m^2/g$.

The preferred matting agents according to the invention have excellent matting properties. The viscosity of the coating formulation is not significantly changed by the incorporation of the preferred agent, so that the formulation containing the agent is readily prepared, handled and applicable. Without wishing to be bound to any specific scientific theory, it is considered that conventional matting agents are mechanically comminuted when incorporated in minute particles in a one-digit nanometer range. This causes a significant increase in viscosity of the formulation. In contrast, the present invention employs agglomerates comprising pigment particles in an average size range of from 0.1 to 1 µm. When incorporated in the formulation, it is currently believed that only a small proportion of the agglomerates are comminuted into their pigment particles. However, these pigment particles do not cause any significant increase in viscosity and enable a simple incorporation. The formulations can be applied to any kind of surfaces, and subsequently cured. Coatings containing titanium dioxide pigment particles and agglomerates thereof have an improved chemical stability, abrasion resistance and soiling resistance as compared to usual coatings containing matting agents.

Therefore, in a first aspect, the invention relates to a matting agent for preparing pigmented mat surfaces, wherein said agent comprises agglomerates of pigment particles, and said agglomerates are characterized by having an average agglomerate size d50 of from 2 to 200 µm, preferably from 2 to 100 µm, more preferably from 2 to 50 µm, and most preferably from 2 to 20 µm, and a specific surface (BET) of from 5 to 50 $m^2/g$.

In a further embodiment, the invention relates to a method for producing such a matting agent comprising agglomerates of pigment particles, characterized in that said pigment particles are agglomerated by granulating, sintering, compression molding, or dispersing followed by drying, preferably by means of dispersing followed by drying.

In another embodiment, the invention relates to matting agents, characterized in that the matting agent is obtainable by such a methods disclosed herein.

In a further embodiment, the present invention refers to a coating formulation for producing pigmented mat surfaces, characterized in that said formulation comprises a matting agent according to the present invention.

In yet another embodiment, the invention relates to a pigmented mat surface of a substrate, characterized in that said surface is coated with a coating formulation as disclosed herein.

In still another embodiment, the invention relates to a plastic comprising the matting agent according to the invention.

Finally, in another embodiment, the invention relates to the use of agglomerates of pigment particles for matting pigmented coatings, wherein said use is characterized in that said agglomerates have an average agglomerate size d50 of from 2 to 200 µm, preferably from 2 to 100 µm, more preferably from 2 to 50 µm, and most preferably from 2 to 20 µm, and a specific surface (BET) of from 5 to 50 m$^2$/g.

Further advantageous embodiments of the invention are stated in the dependent claims.

BRIEF DESCRIPTION OF THE DRAWINGS

For a more complete understanding of the present invention and for further advantages thereof, reference is now made to the following description taken in conjunction with the accompanying drawings in which:

FIG. 1 is a scanning electron micrograph of the pigment of Example 2a.

FIG. 2: is a laser diffraction analysis of the pigments of Examples 1a, 2a and 3a.

DESCRIPTION OF THE PREFERRED EMBODIMENTS

Figure 1:
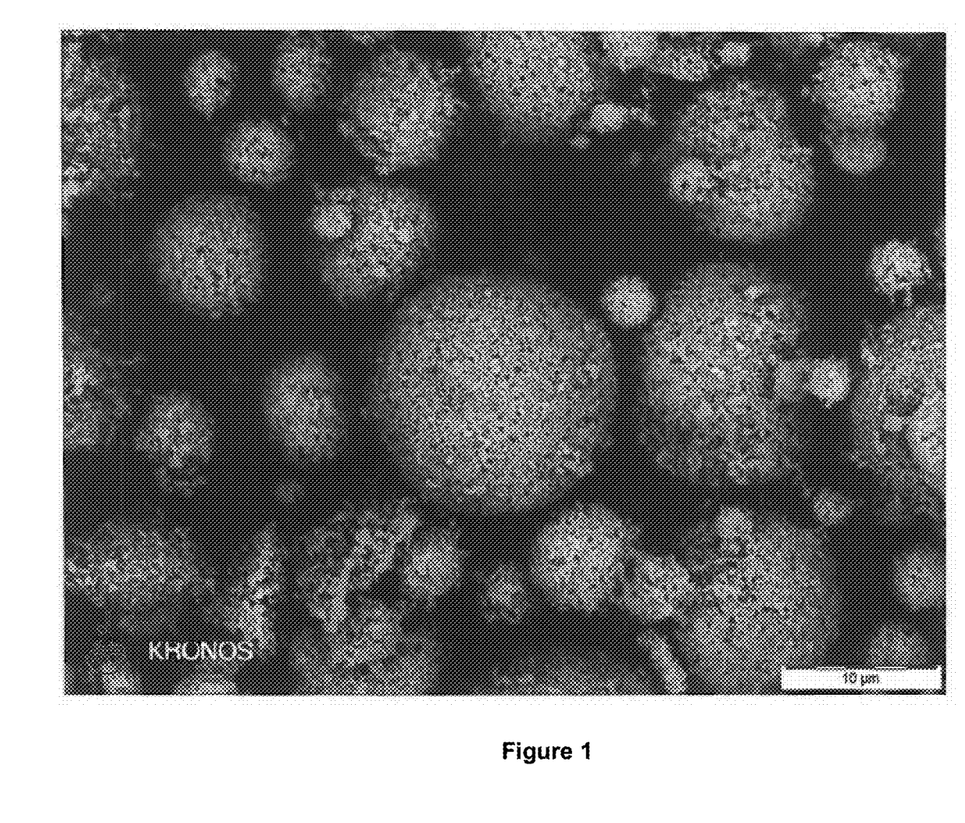
Figure 2:
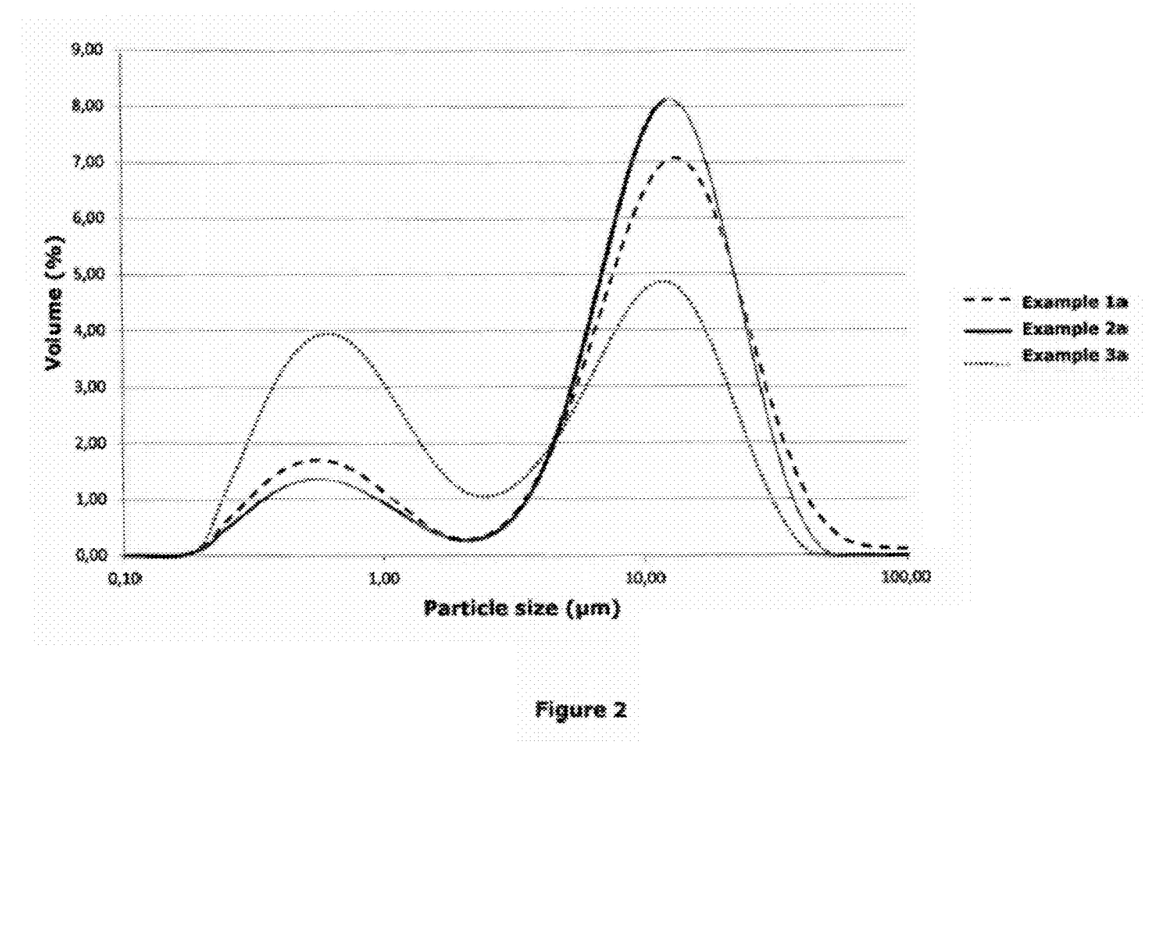
Figure 3:
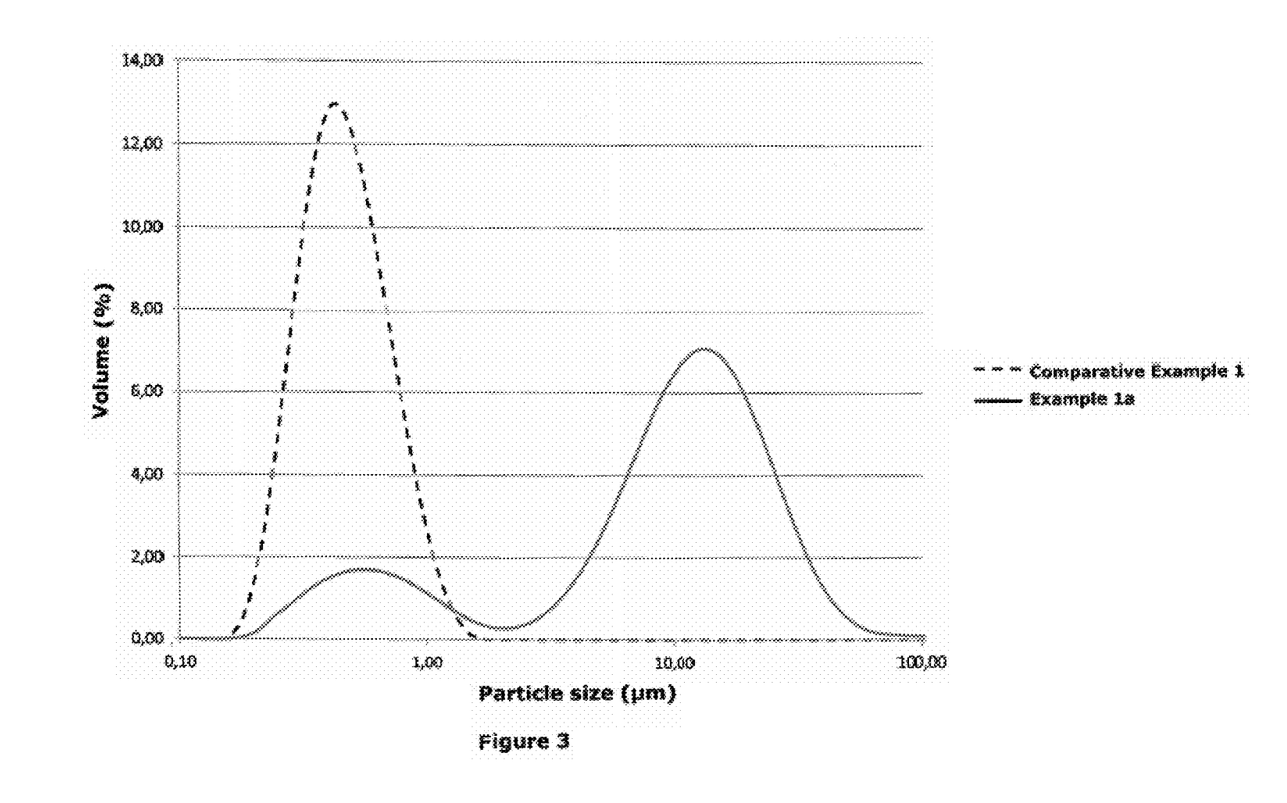
FIG. 3 is a laser diffraction analysis of the pigments of Example 1a and Comparative Example 1.

These and further aspects, features and advantages of the invention become apparent to the skilled person from a study of the following detailed description of certain preferred embodiments and claims. Each feature from one aspect of the invention may also be used in any other aspect of the invention and the invention does not require that all disclosed features or objectives are met. Further, of course, the examples contained herein are intended to describe and illustrate the invention, but not to limit it, and in particular, the invention is not limited to such examples. Numerical ranges stated in the form "from x to y" include the values mentioned and those values that lie within the range of the respective measurement accuracy as known to the skilled person. If several preferred numerical ranges are stated in this form, of course, all the ranges formed by a combination of the different end points are also included. The term "substantially free" is intended to connote that the particular material is not detected (i.e. is below the detection limit) using standard commercial tests and methodologies used in the industry as of the earliest priority date of this application and to allow for the presence of minor trace amounts that may be present as impurities or contaminants in commercially available materials. The term "about" with respect to numerical values and/or ranges is intended to capture the full range of measuring accuracy and uncertainty ranges of standard commercial tests.

All percentages stated in connection with the compositions herein described relate to percent by weight (wt.-%) unless explicitly stated otherwise, respectively based on the mixture of composition in question.

"At least one" as used herein relates to one or more, i.e., 1, 2, 3, 4, 5, 6, 7, 8, 9 or more. With respect to an ingredient, the value relates to the species of the ingredient and not to the absolute number of molecules. Together with weight statements, the value relates to all compounds of the stated kind that are contained in the matting agent, formulation, and plastic, respectively, which means that the matting agent, formulation, and plastic does not contain any further compounds of this kind beyond the stated amount of the corresponding compounds.

Within the scope of the invention, the "average agglomerate or particle size" means the mass-related median d50 (hereinafter: d50). The particle size distribution and the mass-related median d50 were determined by laser diffraction as described herein.

"Pigment", as used herein, relates to inorganic or organic colorants that are virtually insoluble in the application medium according to DIN 55 943, which are neither chemically nor physically changed in the application medium and retain their particulate structure. They are employed for coloring, which is based on the interaction of the pigment particles with the visible light by absorption and remission. Pigment particles usually have an average particle size (d50) within a range of from 0.1 to 1 µm.

The preferred matting agent disclosed herein comprises agglomerates of pigment particles. These agglomerates have an average agglomerate size d50 of from 2 to 200 µm, preferably from 2 to 100 µm, more preferably from 2 to 50 µm, and most preferably from 2 to 20 µm, and a specific surface (BET) of from 5 to 50 m$^2$/g. Preferably, the agglomerates have a specific surface (BET) of from 10 to 30 m$^2$/g, more preferably from 11 to 25 m$^2$/g, and most preferably from 13 to 20 m$^2$/g. The surface was determined by the static-volumetric principle according to DIN 66 131. Coatings containing agglomerates with a low specific surface have a high soiling resistance and are thus particularly advantageous when these are exposed to dirt. Such agglomerates with a low specific surface are suitable, in particular, for storage areas coming into contact with food and drinks, such as tea or coffee, for example, furnishing objects for indoor and outdoor use.

Any pigment known in the prior art and suitable for the purpose according to the invention can be employed as said pigment particle. Said pigment particle may be an organic or inorganic pigment. Mixtures of different organic pigments or of different inorganic pigments or even mixtures of organic and inorganic pigments may also be used.

The organic pigments are usually organic color, white and black pigments. Inorganic pigments may also be color pigments, white pigments and the inorganic pigments usually employed as fillers.

Suitable organic pigments include, without limitation, monoazo pigments, such as C.I. Pigment Brown 25; C.I. Pigment Orange 5, 13, 36, 38, 64 and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251; C.I. Pigment Yellow 1, 3, 62, 65, 73, 74, 97, 120, 151, 154, 168, 181, 183 and 191; C.I. Pigment Violet 32; bisazo pigments, such as C.I. Pigment Orange 16, 34, 44 und 72; C.I. Pigment Yellow 12, 13, 14, 16, 17, 81, 83, 106, 113, 126, 127, 155, 174, 176 und 188; bisazo condensation pigments, such as C.I. Pigment Yellow 93, 95 and 128; C.I. Pigment Red 144, 166, 214, 220, 221, 242 and 262; C.I. Pigment Brown 23 and 41, anthanthrone pigments, such as C.I. Pigment Red 168; anthraquinone pigments, such as C.I. Pigment Yellow 147, 177 and 199; C.I. Pigment Violet 31; anthrapyrimidine pigments, such as C.I. Pigment Yellow 108; quinacridone pigments, such as C.I. Pigment Orange 48 and 49; C.I. Pigment Red 122, 202, 206 and 209; C.I. Pigment Violet 19; quinophthalone pigments, such as C.I. Pigment Yellow 138; diketopyrrolopyrrole pigments, such as C.I. Pigment Orange 71, 73 and 81; C.I. Pigment Red 254, 255, 264, 270 and 272; dioxazine pigments, such as C.I. Pigment Violet 23 and 37; C.I. Pigment Blue 80; flavanthrone pigments, such as C.I. Pigment Yellow 24; indanthrone pigments, such as C.I. Pigment Blue 60 and 64; isoindoline pigments, such as C.I. Pigments Orange 61 and 69; C.I. Pigment Red 260; C.I. Pigment Yellow 139 and 185;

isoindolinone pigments, such as C.I. Pigment Yellow 109, 110 and 173; isoviolanthrone pigments, such as C.I. Pigment Violet 31; metal complex pigments, such as C.I. Pigment Red 257; C.I. Pigment Yellow 117, 129, 150, 153 and 177; C.I. Pigment Green 8; perinone pigments, such as C.I. Pigment Orange 43; C.I. Pigment Red 194; perylene pigments, such as C.I. Pigment Black 31 and 32; C.I. Pigment Red 123, 149, 178, 179, 190 and 224; C.I. Pigment Violet 29; phthalocyanine pigments, such as C.I. Pigment Blue 15, 15:1, 15:2, 15:3, 15:4, 15:6 and 16; C.I. Pigment Green 7 and 36; pyranthrone pigments, such as C.I. Pigment Orange 51; C.I. Pigment Red 216; pyrazolochinazolone pigments, such as C.I. Pigment Orange 67; C.I. Pigment Red 251; thioindigo pigments, such as C.I. Pigment Red 88 and 181; C.I. Pigment Violet 38; triarylcarbonium pigments, such as C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); C.I. Pigment Yellow 101 (aldazine yellow); and C.I. Pigment Brown 22.

Suitable inorganic pigments include, without limitation, white pigments, such as titanium dioxide (C.I. Pigment White 6), zinc white, leaded zinc oxide; zinc sulfide, lithopone; black pigments, such as iron oxide black (C.I. Pigment Black 11), iron manganese black, spinel black (C.I. Pigment Black 27); carbon black (C.I. Pigment Black 7); color pigments, such as chromium oxide, chromium oxide hydrate green; chromium green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt and manganese violet; iron oxide red (C.I. Pigment Red 101); cadmium sulfoselenide (C.I. Pigment Red 108); cerium sulfide (C.I. Pigment Red 265); molybdate red (C.I. Pigment Red 104); ultramarine red; iron oxide brown (C.I. Pigment Brown 6 and 7), mixed brown, spinel and corundum phases (C.I. Pigment Brown, 29, 31, 33, 34, 35, 37, 39 and 40), chromium titanium yellow (C.I. Pigment Brown 24), chromium orange; cerium sulfide (C.I. Pigment Orange 75); iron oxide yellow (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chromium yellow (C.I. Pigment Yellow 34), and bismuth vanadate (C.I. Pigment Yellow 184).

The inorganic pigment of the invention is preferably a metal salt and more preferably a metal oxide. "Metal salt", as used herein, refers to the generally accepted definition of that term and is a salt comprising at least one metal cation and at least one anion. "Metal oxide", as used herein, refers to the generally accepted definition of that term and is a compound which comprises at least one metal atom and at least one oxygen atom.

Further, inorganic pigment particles that are conventionally used as fillers, such as aluminum oxide, aluminum hydroxide, zinc sulfide, natural and precipitated chalk and barium sulfate, may also be used.

Preferably, the pigment particle is selected from the group consisting of magnesium carbonate, barium sulfate, titanium dioxide, zinc oxide, zinc sulfide, huntite, lead white, lithopone, cristobalite, china clay, and mixtures thereof. Among all pigment particles disclosed herein, titanium dioxide is most preferred because of its pigment properties and its high Mohs hardness. Titanium dioxide may be present in the crystal structures of rutile, anatase or brookite, usually in the crystal structures of rutile or anatase. Rutile is particularly suitable as compared to anatase because of its lower photolytic catalytic activity.

Further, the pigment particle may be aftertreated inorganically and/or organically. Thus, the particle is contacted with inorganic or organic substances. Such substances and techniques are known in the art. The inorganic substances include, inter alia, silicon dioxide and aluminum oxide. In a preferred embodiment, the particle is inorganically aftertreated.

As mentioned above, titanium dioxide is most preferably selected as the pigment particle. The titanium dioxide as disclosed herein may have been obtained by the sulfate process or by the chloride process. It is preferably selected from the group consisting of untreated titanium dioxide pigment, aftertreated non-micronized titanium dioxide pigment, ready-made titanium dioxide pigment, and mixtures thereof. "Aftertreated", as used herein, relates to at least one further process step that is performed after the preparation of the pigment or raw pigment. Such process steps are well established in the prior art. These include, for example, sand milling, applying layers to the pigment or raw pigment, washing, drying, steam milling, or combinations of such steps. In a conventional aftertreatment, the raw pigment is first subjected to sand milling, an optional inorganic modification with silicon dioxide and aluminum oxide, washing, drying, and finally steam milling. The aftertreatment serves for the improvement of the physical, especially optical, and chemical properties of the particle pigment or agglomerate, and can be adapted to the respective specific use of the finished pigment, for example, the respective coating formulation. In different embodiments, the titanium dioxide has been aftertreated with silicon dioxide and/or aluminum oxide. Thus, the titanium dioxide may be aftertreated first with silicon dioxide and subsequently with aluminum oxide. This aftertreatment as well as substances and techniques used for it are well known in the prior art. Aftertreated pigments are also referred to as finished pigments in the prior art. Consequently, "untreated", as herein defined, relates to the pigment particle or raw pigment. Thus, the titanium dioxide can be used according to the invention as a raw pigment according to the sulfate process. It may be dried, preferably spray-dried, or dispersed in solvent before drying if necessary.

The adjustment of the particle size can be effected by means of established methods, such as milling, or by selecting particular conditions during the pigment production.

Preferably, the pigment particle has an average particle size d50 of from 100 to 1000 nm, more preferably from 200 to 500 nm.

Further, the agglomerates have an oil absorption value as measured according to DIN ISO 787 Part 5 of preferably 15 to 25 g/100 g, more preferably 17 to 22 g/100 g.

The agglomerates of the pigment particles according to preferred embodiments of the invention can be prepared by any method disclosed in the prior art. Preferably, the pigment particles are agglomerated by granulating, sintering, compression molding, or dispersing followed by drying. More preferably, the pigment particles are dispersed at first and subsequently dried. The dispersing may also be effected by any conventional methods suitable for this. Thus, the pigment particles may be admixed with a solvent, wherein water, organic solvents or mixtures thereof may be used. Suitable organic solvents include all organic solvents known in the prior art and suitable for the purpose according to the invention, especially polar-protic and polar-aprotic solvents. These include without limitation alcohols, such as isopropanol, n-propanol, and acetone, ethyl acetate, ethylmethylketone, tetrahydrofuran (THF) and dimethyl sulfoxide (DMSO). Further, short-chained alkanes, such as pentane or heptane, may also be employed. Further, a usual dispersant, such as the commercially available Tegomer DA 640, trimethylolpropane (TMP), octyltrichlorosilane (OCTCS), octyltriethoxysilane (OCTEO) or etidronic acid, may be added. The dispersing may be effected by usual methods and techniques, for example, in a container equipped with a usual stirrer. Preferably, the dispersing of the pigment particles is performed in an agitator bead mill. For this method, for example, zirconium oxide milling beads of a size of 0.4 to 0.6 mm may be used, and milling may be effected at a revolutions per minute of 3000 rpm for 15 to 30 min in a cycle.

The subsequent drying can be effected by any method and technique known in the art. For this purpose, without limitation, belt dryers, rack dryers, rotary dryers and spray-dryers are suitable. Preferably, the dispersion is dried by spray-drying. The drying conditions are selected in such a manner that agglomerates in the size ranges disclosed herein are formed. Optionally, agglomerates with a narrower size distribution can be achieved by means of established separation methods. The agglomerates may also be comminuted using usual techniques in order to achieve the herein disclosed sizes. These include, without limitation, milling, for example, with an impact mill.

The matting agents obtainable by the method disclosed herein are also claimed.

The preferred embodiments of the present invention further relates to coating formulations for preparing pigmented mat surfaces that comprise the matting agents herein described. The agent can be contained in an amount of 0.1 to 98 wt.-%, preferably 1 to 50 wt.-%, more preferably 2 to 25 wt.-%, and most preferably 3 to 23 wt.-%, based on the total weight of the coating formulation. Optionally, these formulations may further comprise pigments. In a preferred embodiment, these pigments have the same composition as the pigments of the agglomerates, in other words, the compositions of the pigments and of the pigments of the agglomerates are identical. It is further preferred that the formulation does not contain an additional, non-agglomerated, pigment.

In addition to the matting agent according to the invention, the formulation may contain usual matting agents. Preferably, the formulation does not contain any further matting agents.

Preferably, the formulation contains usual components. Any components known in the art that are suitable for the purpose according to the invention may be employed as a component. Preferably, the formulation comprises at least one component selected from the group consisting of a binder, defoamer, dispersant, filler, solvent, preservative, auxiliary film forming agent, and rheology additive. The preservatives also include usual fungicides. The coating formulations include lacquers, paints as well as printing inks.

The preferred embodiments of the present invention further relates to a pigmented mat surface of a substrate, wherein said surface is characterized in that said surface is coated with a coating formulation as disclosed herein. The formulations may be in the form of the established one-part, two-part and multicomponent paints in the usual compositions. The paints are applied to the substrate by usual techniques and methods, and cured as a function of the paint composition, especially the binder, for example, by means of UV irradiation or drying. The substrates include without limitation wood, plastics, metals, paper, glass fabric, and mixtures thereof.

The preferred embodiments of the current invention still further relates to a plastic characterized in that said plastic comprises a matting agent according to the invention. Any plastic known in the prior art and suitable for the purpose according to the invention can be employed as the plastic. "Plastic", as used herein, relates to a material containing at least 50 wt.-% of a polymer, based on the total weight of the plastic. Said polymer may be a homopolymer, a copolymer or a grafted polymer. Further, the polymer may be an atactic, isotactic or syndiotactic polymer. Further, the plastic is a thermoplast, elastomer, duroplast or thermoplastic elastomer, preferably a thermoplast. Without limitation, the polymer is selected from the group consisting of polyolefins, polystyrene, polyamide, polyketone, polyester, polyurethane, poly(meth)acrylate, and mixtures thereof. Without limitation, the polyolefin is selected from the group consisting of polyethylene, polypropylene, polybutylene, and mixtures thereof. The matting agent can be incorporated in the plastic by known techniques and methods, for example, by extruding. The matting agent is processed into the plastic in the usual amounts. Thus, the plastic obtained contains from 0.1 to 30 wt.-%, preferably from 1 to 25 wt.-%, of the agent according to the invention, based on the total weight of the plastic.

Finally, the preferred embodiment of the current invention further relates to the use of agglomerates of pigment particles for matting pigmented coatings, characterized in that said agglomerates have an average agglomerate size d50 of from 2 to 200 µm, preferably from 2 to 100 µm, more preferably from 2 to 50 µm, and most preferably from 2 to 20 µm, and a specific surface (BET) of from 5 to 50 $m^2$/g.

In another embodiment of the invention, pigment mixtures may also be employed as pigment compositions, for example, in which a usual pigment that provides for glossy surfaces is mixed with pigment agglomerates.

The pigment composition according to a preferred embodiment of the invention contains agglomerates of the pigment particles. In the finished coating, the pigment composition is in the form of both pigment particle agglomerates, which provide for the sought surface roughness, and readily dispersible pigment particles, which meet the classical requirements for a pigment.

A preferred embodiment of the invention is based on pigment compositions in coatings such as lacquers, paints and printing inks, serving both as a matting agent and as a pigment, so that the use of an additional matting agent for producing matted surfaces can be omitted.

Test Methods

Particle Size Distribution and Mass-related Median d50

The particle size distribution and the mass-related median d50 were determined by laser diffraction using a Mastersizer 2000 from the company Malvern. For the measurement, a suspension of Calgon solution (80 ml, 0.06% in distilled water) was dispersed with the particle material to be examined (2 g) for 60 seconds using an Ultraturrax stirrer at 9500 rpm.

The measurement was performed with the following appliance settings:

Refractive index (n), medium (water): 1.33

Refractive index (n), titanium dioxide (rutile): 2.741 (in red laser) and 2.960 (in blue light);

Refractive index (n), titanium dioxide (anatase): 2.550 (in red laser) and 2.500 (in blue light);

Absorption index (k), titanium dioxide (rutile): 0.08 (in red laser) and 0.08 (in blue light);

Absorption index (k), titanium dioxide (anatase): 0.07 (in red laser) and 0.08 (in blue light);

Laser shading: 0.8%;

Wavelength of the light sources: red: 633 nm; blue: 466 nm.

KU Viscosity (Pot Viscosity)

The KU viscosity of the fresh paint was determined with a Krebs-Stormer viscometer (KU-2 viscometer) from the company Brookfield. The result is expressed in Krebs units.

Oil Absorption

The amount of linseed oil required for the complete wetting of the particle material to be examined (100 g) is determined. The method is carried out in accordance with DIN ISO 787 Part 5.

Specific Surface (BET)

The BET surface is determined/measured with a Tristar 3000 from the company Micromeritics based on the static-volumetric principle according to DIN 66 131.

EXAMPLES

The invention can be further understood by means of the following examples, which are provided to illustrate but not limit the invention.

Example 1a

A titanium dioxide pigment mother substance in the rutile crystal modification was aftertreated with $Al_2O_3$, filtered, washed, separated off and dried, but not micronized, and subsequently mixed to an aqueous suspension again with $TiO_2$ (2.5 kg) in water (3.25 liters). The suspension was dispersed in an agitator bead mill Labstar (0.4 to 0.6 mm SiLi Beads Type ZY) for 16 min in a cycle process with a specific energy input of 0.2 kWh/kg. Subsequently, the suspension was dried in a spray dryer (Büchi Mini Spray Dryer B-290).

The spray dryer agglomerates had a particle size d50 of 10 µm, a specific surface (BET) of 16 $m^2/g$, and an oil absorption of 20 g/100 g.

Example 1b

With the spray-dried pigment from Example 1a, an aqueous dispersion paint (pigment concentration by volume=19%) according to the following protocol:

At first, a premixed solution was prepared with the components according to Table 1 and by means of a dissolver. Subsequently, the premix (192.50 g) was mixed with a titanium dioxide pigment (57.50 g) obtained according to Example 1a) in a Skandex mixer with the addition of glass beads (50 g, SiLi Beads Type S) for 30 minutes.

TABLE 1

| Premixed solution | | |
| --- | --- | --- |
| Component | | Amount [g] |
| Water | | 36.50 |
| Defoamer | Agitan E255 | 1.00 |
| Fungicide/algicide | Actizid MBS | 0.50 |
| Dispersant | Dispex CX4320 | 2.50 |
| Dispersant | Edaplan 480 | 2.50 |

TABLE 1-continued

| Premixed solution | | |
| --- | --- | --- |
| Component | | Amount [g] |
| Thickener | Rheolate 644 | 2.50 |
| Binder | Acronal LR9014 | 147.0 |
| | Total | 192.50 |

The KU viscosity (pot viscosity) of the fresh paint mixture was determined. For determining the gloss, a mount on a black-and-white contrast cardboard was prepared, and the gloss (20°, 60°, 85°) was subsequently measured with a Haze-Gloss Reflectometer of the company Byk-Gardner. The measured data can be seen from Table 2.

Example 2a

Spray-dryer agglomerates as in Example 1a were prepared, except that the dispersant Tegomer DA 640 (25 g) was added to the suspension in the agitator bead mill.

The spray-dryer agglomerates had a particle size d50 of 10 µm, a specific surface (BET) of 13.8 $m^2/g$, and an oil absorption of 19.6 g/100 g.

Example 2b

An aqueous dispersion paint as in Example 1b was prepared, and the KU viscosity and the gloss (20°, 60°, 85°) were determined as in Example 1b. The measured data can be seen from Table 2.

Example 3a

Spray-dryer agglomerates as in Example 2a were prepared, except that the pigment was mixed to a suspension again in ethanol/ethyl acetate (3.25 liters, ratio 1.6:1) rather than in water (3.25 liters).

The spray-dryer agglomerates had a particle size d50 of 4 µm, a specific surface (BET) of 13.5 $m^2/g$, and an oil absorption of 20 g/100 g.

Example 3b

An aqueous dispersion paint as in Example 1b was prepared, and the KU viscosity and the gloss (20°, 60°, 85°) were determined as in Example 1b. The measured data can be seen from Table 2.

Comparative Example 1

Comparative Example 1 includes the preparation of an aqueous dispersion paint as described in Example 1b, wherein a titanium dioxide pigment in the rutile crystal modification, commercially available under the product name Kronos 2066 from Kronos International Inc., aftertreated with $Al_2O_3$ was employed instead of the spray-dried pigment according to Example 1a. The KU viscosity and the gloss (20°, 60°, 85°) were determined as in Example 1b. The measured data can be seen from Table 2.

Comparative Example 2

Comparative Example 2 includes the preparation of an aqueous dispersion paint as described in Comparative Example 1, except that the commercially available matting agent Acematt TS100 (8.82 g, corresponding to 6% by weight, based on the binder) was additionally added to the premixed solution (see Table 1). The KU viscosity and the gloss (20°, 60°, 85°) were determined as in Example 1b. The measured data can be seen from Table 2.

Comparative Example 3

Comparative Example 3 includes the preparation of an aqueous dispersion paint as described in Comparative Example 2, except that Syloid W500 (8.82 g, corresponding to 6% by weight, based on the binder) was employed as a commercially available matting agent. The KU viscosity and the gloss (20°, 60°, 85°) were determined as in Example 1b. The measured data can be seen from Table 2.

TABLE 2

| | Aqueous dispersion paint | | | |
|---|---|---|---|---|
| | Gloss 20° | Gloss 60° | Gloss 85° | KU viscosity [Krebs units] |
| Example 1b | 0 | 14 | 21 | 120 |
| Example 2b | 0 | 10 | 12 | 119 |
| Example 3b | 8 | 42 | 68 | 122 |
| Comparative Example 1 | 47 | 75 | 95 | 121 |
| Comparative Example 2 | 26 | 64 | 88 | 140 |
| Comparative Example 3 | 11 | 52 | 76 | 127 |

As compared to the comparative paints prepared with commercially available titanium dioxide pigment and additionally with 6% by weight of commercially available matting agent (Comparative Examples 2, 3), the paints prepared according to the invention (Examples 1b, 2b, 3b) have a higher matting degree (lower gloss) and a lower viscosity (KU viscosity). As compared to the glossy paint prepared with commercially available titanium dioxide that does not contain any matting agent (Comparative Example 1), the mat paints prepared according to the invention (Examples 1b, 2b, 3b) do not show any significant increase in viscosity (KU viscosity).

What is claimed is:

1. A matting agent useful for preparing pigmented mat surfaces comprising pigment particles wherein such pigment particles are present in agglomerates having an average agglomerate size d50 of from about 2 to about 200 μm and a specific surface (BET) area of from about 5 to about 50 $m^2/g$ and where the pigment particles have an average particle size d50 of from about 200 to about 500 nm.

2. The matting agent of claim 1, wherein the agglomerates have an average agglomerate size of from about 2 to about 100 μm.

3. The matting agent of claim 2, wherein the agglomerates have an average agglomerate size of from about 2 to about 50 μm.

4. The matting agent of claim 3, wherein the agglomerates have an average agglomerate size of from about 2 to about 20 μm.

5. The matting agent of claim 1, wherein agglomerates have a specific surface (BET) of from 10 to 30 $m^2/g$.

6. The matting agent of claim 5, wherein agglomerates have a specific surface (BET) of from 11 to 25 $m^2/g$.

7. The matting agent of claim 6, wherein agglomerates have a specific surface (BET) of from 13 to 20 $m^2/g$.

8. The matting agent of claim 1, wherein the agglomerates have an oil absorption value as measured according to DIN ISO 787 Part 5 of about 15 to about 25 g/100g.

9. The matting agent of claim 8, wherein the agglomerates have an oil absorption value as measured according to DIN ISO 787 Part 5 of about 17 to about 22 g/100g.

10. The matting agent of claim 1, wherein the pigment particles are a metal oxide.

11. The matting agent of claim 10, wherein the metal oxide is titanium dioxide.

12. The matting agent of claim 11, wherein the titanium dioxide is selected from the group consisting of untreated titanium dioxide pigment, aftertreated non-micronized titanium dioxide pigment, ready-made titanium dioxide pigment, and mixtures thereof.

13. The matting agent of claim 12, wherein the matting agent is incorporated into a coating formulation for producing pigmented mat surfaces.

14. The matting agent of claim 13 wherein the coating formulation does not contain any additional matting agent.

15. The matting agent of claim 13 wherein the coating formulation does not contain any non-agglomerated pigment.

16. The matting agent of claim 13, wherein the coating formulation further comprises at least one component selected from the group consisting of a binder, defoamer, dispersant, filler, solvent, preservative, auxiliary film forming agent, and rheology additive.

17. The matting agent of claim 13, wherein the coating fomulation is applied to a substrate to form a pigmented mat surface.

18. The matting agent of claim 11, wherein the agglomerates have an average agglomerate size of from about 2 to about 100 μm.

19. The matting agent of claim 18, wherein the agglomerates have an average agglomerate size of from about 2 to about 50 μm.

20. The matting agent of claim 19, wherein the agglomerates have an average agglomerate size of from about 2 to about 20 μm.

21. The matting agent of claim 11, wherein agglomerates have a specific surface (BET) of from 10 to 30 $m^2/g$.

22. The matting agent of claim 21, wherein agglomerates have a specific surface (BET) of from 11 to 25 $m^2/g$.

23. The matting agent of claim 22, wherein agglomerates have a specific surface (BET) of from 13 to 20 $m^2/g$.

24. The matting agent of claim 11, wherein the agglomerates have an oil absorption value as measured according to DIN ISO 787 Part 5 of about 15 to about 25g/100g.

25. The matting agent of claim 24, wherein the agglomerates have an oil absorption value as measured according to DIN ISO 787 Part 5 of about 17 to about 22 g/100g.

26. The matting agent of claim 11, wherein the agglomerates:
have an average agglomerate size of from about 2 to about 100 μm;
have a specific surface (BET) of from 10 to 30 $m^2/g$; and
have an oil absorption value as measured according to DIN ISO 787 Part 5 of about 15 to about 25 g/100g.

27. The matting agent of claim 26, wherein the agglomerates:
have an average agglomerate size of from about 2 to about 50 μm;
have a specific surface (BET) of from 11 to 25 $m^2/g$; and
have an oil absorption value as measured according to DIN ISO 787 Part 5 of about 17 to about 22 g/100g.

28. The matting agent of claim 27, wherein the agglomerates:
have an average agglomerate size of from about 2 to about 20 μm; and
have a specific surface (BET) of from 13 to 20 $m^2/g$.

29. The matting agent of claim 1, wherein the matting agent is incorporated into a coating formulation for producing pigmented mat surfaces.

30. The matting agent of claim 1, wherein the matting agent is further incorporated into a plastic composition.

31. A method for obtaining a matting agent comprising the steps of:
   providing pigment particles having an average particle size d50 of from about 200 to about 500 nm;
   agglomerating the pigment particles by a process selected from the group consisting of granulating, sintering, compression molding, dispersing and combinations thereof until the agglomerated particles have an average agglomerate size d50 of from about 2 to about 200 μm and a specific surface (BET) area of from about 5 to about 50 $m^2/g$; and
   drying the agglomerated particles.

32. The method of claim 31, wherein the agglomeration step is accomlished by dispersing the pigment particles.

33. The method of claim 32, wherein the dispersing step is performed in an agitator bead mill.

34. The method of claim 32, wherein the drying step is performed by spray drying.

35. The method of claim 32, wherein the dispering step includes the use of a solvent selected from the group consisting of water, organic solvents and mixtures thereof and optionally includes the use of a dispersant.

36. The method of claim 31, wherein the pigment particles are selected from the group consisting of untreated titanium dioxide pigment, aftertreated non-micronized titanium dioxide pigment, ready-made titanium dioxide pigment, and mixtures thereof.

* * * * *